May 8, 1956  H. J. FINDLEY  2,744,596
MAGNETIC DRIVE
Original Filed June 4, 1949  2 Sheets-Sheet 1
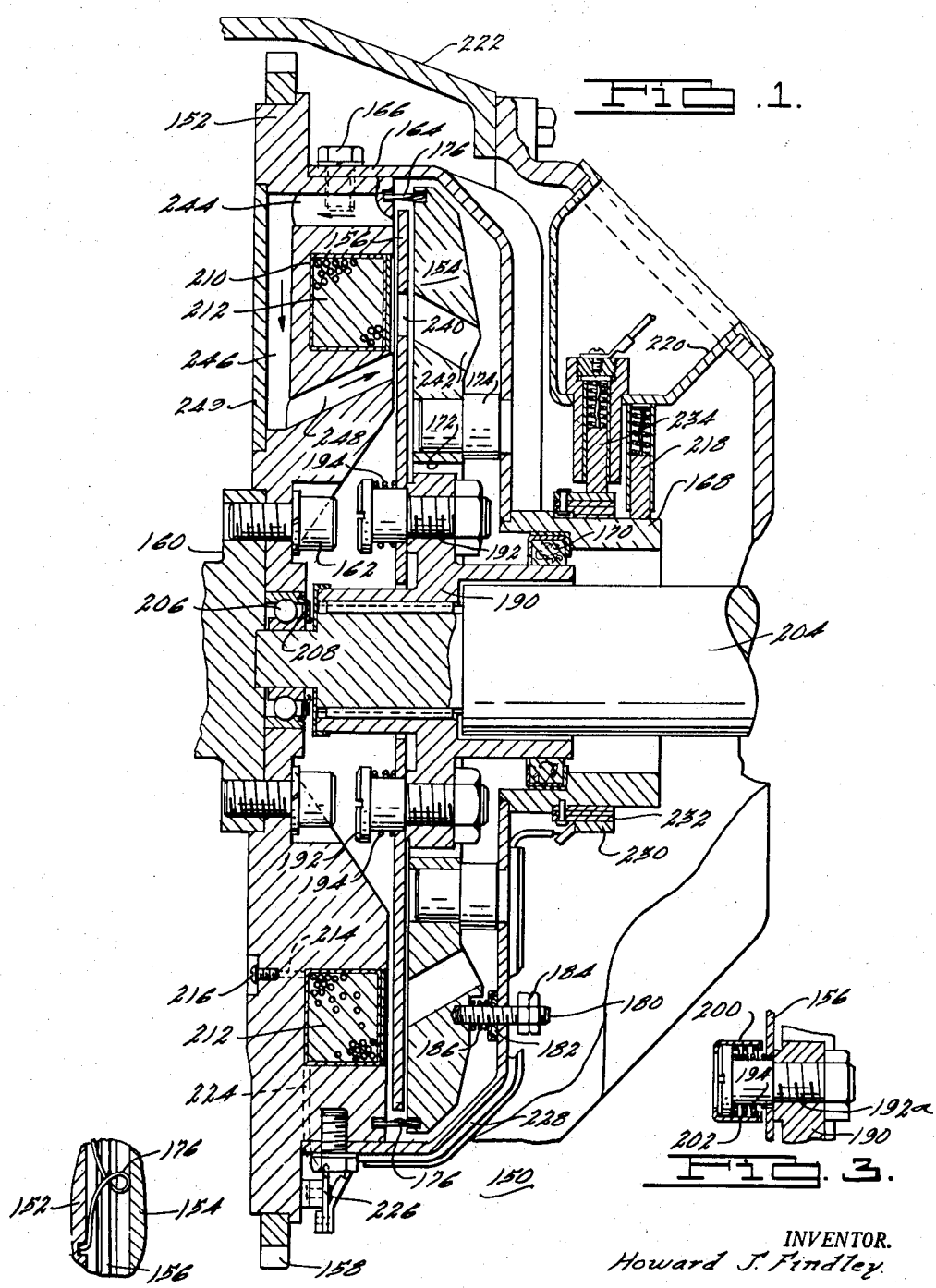
INVENTOR.
Howard J. Findley
BY
Harness, Dickey & Pierce
ATTORNEYS.

May 8, 1956  H. J. FINDLEY  2,744,596
MAGNETIC DRIVE
Original Filed June 4, 1949  2 Sheets-Sheet 2
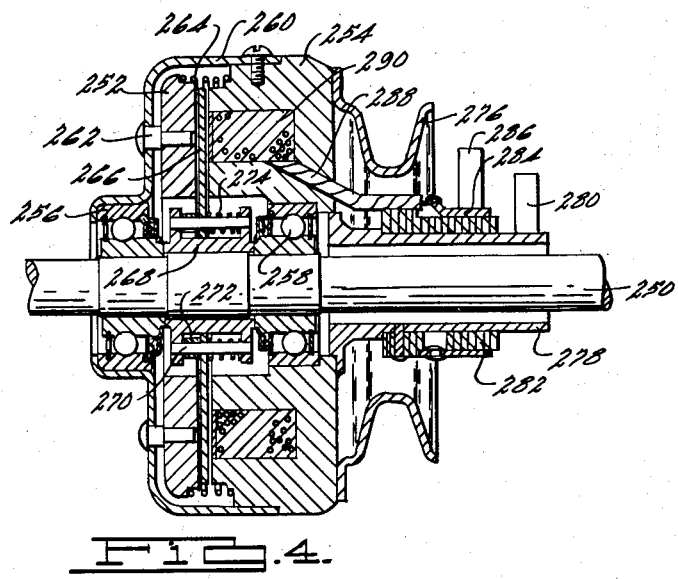
INVENTOR.
Howard J. Findley
BY
Harness, Dickey & Pierce
ATTORNEYS.

United States Patent Office 2,744,596
Patented May 8, 1956

2,744,596

MAGNETIC DRIVE

Howard J. Findley, Cleveland, Ohio, assignor, by direct and mesne assignments, to Eaton Manufacturing Company, Cleveland, Ohio, a corporation of Ohio Original application June 4, 1949, Serial No. 97,269, now Patent No. 2,519,449, dated August 22, 1950. Divided and this application July 17, 1950, Serial No. 174,229

4 Claims. (Cl. 192—21.5)

This invention relates generally to magnetic drives, and more particularly to magnetic clutches for controllably coupling two members together and is particularly adapted, among other uses, as a magnetic clutch for coupling a prime mover to a rotatable load whereby the rotation of the load may be controlled. This application is a division of applicant's copending application Serial No. 97,269, filed June 4, 1949, now Patent No. 2,519,449, granted August 22, 1950, as a continuation-in-part of applicant's copending but now abandoned application, Serial No. 38,543, filed July 13, 1948.

Objects of this invention are to provide such a magnetic clutch having improved operating characteristics; to provide such improved characteristics by the addition of a bonding material comprising a quantity of finely divided magnetic material and a quantity of finely divided solid lubricant; to provide such a high torque clutch which has a low no-load drag; to provide such structures embodying improved means which act upon the bonding material under unexcited conditions of the unit to maintain bonding material in the air gap regions, in readiness to establish the bond; and to generally improve magnetic drives of the character described.

Referring to the drawings:

Fig. 1 is a view in axial section of an embodiment of the invention;

Fig. 2 is a fragmentary view illustrating a detail of Fig. 1;

Fig. 3 is a fragmentary view illustrating a modified spring structure which may be used in the structure of Fig. 1; and, Fig. 4 is a view in axial section of another form of plate clutch embodying the invention.

In accordance with the broader aspects of the present invention, it may be applied to a wide variety of magnetic clutch constructions, which constructions may be generically classified as including a plurality of relatively rotatable members formed at least in part of magnetic material and so arranged as to receive between adjacent faces thereof a quantity of the hereinafter described bonding material. When energized, the bonding material appears to provide a magnetically established electromechanical bond between the two members which, within certain torque limits, causes the members to move synchronously and, beyond these torque limits, permits a slipping movement between the driving and the driven ones of the members.

Within the purview of the invention, the members themselves may be variously constructed, the resultant torque may be due entirely or in part to the aforesaid bond, the excitation may be variously applied, and may be either intermittent or continuous, and the members may interchangeably serve as driven or driving members. To illustrate the wide adaptability of the invention, and the wide variety of structures which may embody it, a number of different clutch structures are disclosed herein, in an illustrative and not in a limiting sense.

The magnetic clutches of Figs. 1 through 4 are of the plate type, in the inter-plate region of which has been placed a quantity of fine magnetic particles of the order of 8 microns in diameter, and a quantity of solid dry powdered lubricant such as graphite, mica, soapstone, potstone, steatite, French chalk, lampblack, and so forth, or mixture thereof. The presence of the magnetic particles in the air gap tremendously increases the torque which may be transmitted by a unit of given size. The use of the dry lubricant permits the operation of the unit under slip conditions without undue internal losses and particularly at non-excited or no-load conditions. The addition of this powdered mixture permits synchronous rotation of driving and driven members in which condition there is no eddy current driving effect between the two members and the sole driving effect appears to be that produced as a result of the presence of the magnetic material in the air gap. It further permits operating under slip conditions in which the dry lubricant prevents undue abrasion and wearing of the unit, and no-load or non-excited operation with full slip in which the dry lubricant and magnetic particles offer little if any resistance to relative rotation of the driving and driven members.

The exact theory of the action of these materials, defined below as bonding materials, is not known with absolute certainty, but the results are definite and positive. It is believed that the presence of this powdered material in the coupling acts, under energized conditions, to provide pillars or columns lying in the flux paths and which are formed and held together by the flux flowing in such paths so that the driving member is connected mechanically and frictionally to the driven member by means of such columns. Under deenergized conditions, and except as noted below, the components of the bonding material have complete freedom of movement and so do not cause a drag between the two relatively movable parts of the coupling.

Throughout this specification and claims the term "powdered bonding material" is used as comprising several different materials, one having magnetic characteristics such as iron and another having lubricating but substantially non-cohesive characteristics such as the solid lubricants mentioned above, or mixtures of the lubricants. In the presently preferred embodiments of the invention, a preferred magnetic material is that known commercially as Carbonyl E and a preferred solid lubricant is powdered graphite. As aforesaid, Carbonyl E has a grain size of about 8 microns, and the graphite may be of the order of 200 mesh.

Different operating conditions determine the most preferable ratio between the weight of magnetic particles and the particles of solid lubricant. For example, excellent results have been obtained with structures of the type disclosed in Figs. 1 through 4, using a 50–50 mixture, as measured by volume, of Carbonyl E and graphite. The mesh of the lubricant may vary between wide limits but experimental results with the various structures disclosed herein indicate that the finer the powder the better the obtained results. Mixtures containing a higher percentage of graphite than that given above have been used with good results. Similarly, in all cases, various factors determine the optimum quantity of powdered mixture in relation to the size of the magnetic drive and particularly to the volume of the air gap. Generally speaking, it is preferred to use a volume of powdered mixture which is substantially in excess of the volume of the air gap, but which is also a minor fraction, twenty-five per cent or less, of the free volume of the unit.

Continuing with the general description of the invention, the formed columns which produce the bond are believed to be composed almost entirely of the magnetic material and are believed to bear against the driving and driven surfaces of the coupling. The bearing of the columns so formed against these surfaces apparently sets up a frictional engagement therebetween which opposes relative movement between these column ends and the surfaces with which they are engaged.

These frictional forces, at least within limits, will be proportional to the strength of the magnetic field transmitted through the columns. During synchronous operation of the structure of Fig. 1 these columns are the only driving force between the driving and driven members. Under slip conditions of operation, however, it appears that the pillars no longer engage the cooperating surfaces with sufficient force to cause simultaneous rotation between the driving and driven members. Under this operating condition, slipping is believed to occur between the ends of the magnetic columns and the surfaces of the members.

Experiments with the units now being described show that when a powdered dry lubricant is used, as disclosed, and when the units are deenergized the magnetic material columns will immediately collapse and disintegrate to their constituent particles. Except as described below, these particles, and the lubricant particles, are somewhat dustlike in character and freely float within the units, more or less as free floating particles which do not tend to adhere together in larger masses or groups and which show no appreciable tendency to form a gummy substance imposing an undesired drag between the rotor and drum. Under such conditions there is no substantial drag imposed by one member on the other member irrespective of which member is driven.

It may thus be seen that the presence of this powdered material increases the torque which may be transmitted through a magnetic unit under driving conditions; that under no-load or idling conditions, it does not impose an undesirable drag; and that the units operate efficiently and over long periods of time under severe loading conditions. Even under heavy duty loadings, the breakdown temperatures of the extremely stable constituents of the bonding material are never approached.

Moreover, because of the freedom from frictional drag under unexcited conditions, the internal heat which is developed in the unit is materially reduced. Thus the overall effect of the powdered mixture is to permit of a much smaller unit for any given load and the elimination of special provisions for cooling.

The herein disclosed embodiments of the invention illustrate forms of the improvements generically claimed in said Patent No. 2,519,449 wherein the principal clutch elements are in axially opposed relation (more specifically, of the plate type), and in which special provision is made to insure that an adequate amount of bonding material is at all times maintained in the space between the opposed clutch surfaces. In these embodiments, this last named feature is accomplished in two ways, which are preferably employed together but which, in the broader aspects of the invention, may individually be relied upon to maintain the bonding material in the said space.

The first herein illustrated expedient for controlling the positioning of the bonding material comprises generally the provision of circulating passages of such form and arrangement that the bonding material is caused to circulate along a path which includes the space between the opposed clutch surfaces.

The second herein illustrated expedient for controlling the positioning of the bonding material comprises generically an arrangement wherein bonding material is caused to adhere to or become a part of the opposed bonding surfaces of one or more of the relatively movable clutch elements. Specifically, as herein illustrated, this adherence is effected magnetically by forming one or more of the opposed bonding surfaces of material which has a substantial amount of magnetic retentivity in consequence of which even under unexcited conditions of the unit, a substantial amount of the bonding material is positively held on the bonding surface or surfaces.

The remaining embodiments also illustrate the adaptability of the present invention to structures employing compound air gaps and air gaps which are increased or decreased, depending upon the unexcited or excited condition of the unit.

Referring now to Figure 1, the illustrated unit 150 is a plate clutch designed specifically for use as the main clutch for an automotive vehicle, and is consequently adapted for connection between the crankshaft and the transmission of such a vehicle. In Figure 1, the clutch comprises a pair of axially spaced and relatively movable driving shoes 152 and 154 which receive between them a driven plate 156. Shoe 152 also constitutes a flywheel, and is shown as carrying a conventional ring gear 158 for cooperation with the usual cranking mechanism (not shown). The outer face of shoe 152 is centrally recessed to accommodate the conventional associated crankshaft flange 160, and these elements are secured together by a plurality of circumferentially distributed studs 162.

Shoe 152 constitutes one side of the enclosing shell for the unit. The other part of the shell is provided by a cup-shaped member 164 which fits over a shoulder provided on the member 152, and is secured in place thereon by a plurality of circumferentially distributed studs 166. Shell member 164 is provided with a cylindrical neck 168, which carries a shaft seal 170 and also, as described below, serves as a slip ring.

The inner shoe 154 is ringlike in structure and has a central aperture 172. Shoe 154 is connected to shell member 164, for rotation therewith, but for axial movement with respect thereto, by a plurality of circumferentially distributed pins 174. Pins 174 are fixed to member 164, and their reduced end portions have sliding fits within apertures provided therefor in shoe 154.

Under unexcited conditions, the illustrated normal spacing is maintained between the shoes 152 and 154 by spring means interposed therebetween and herein illustrated as comprising a plurality of separate hairpinlike elements 176 which are received in annular grooves provided therefor in the faces of the elements 152 and 154. Springs 176 are conventional, and their general nature is indicated in Figure 2. Under excited conditions, shoe 154 is drawn towards shoe 152. Generically speaking, this axial movement of shoe 154 may be permitted to continue and bring the three clutch elements 152, 156 and 154 into direct face-to-face engagement with each other through the interposed layer of bonding material, proper limits to the engaging pressures being established by properly proportioning the magnetizing field strength relative to the related opposing spring elements. In the preferred practice of the invention, however, a limit is imposed to the axial movement of shoe 154, which maintains it slightly spaced from the plate 156. As shown, these limiting means comprise a series of circumferentially distributed studs 180, which are threaded into tapped openings provided therefor in shoe 154. Studs 180 pass freely through openings provided therefor in the shell member 164, these apertures being sealed by conventional seals 182. Adjustable nuts 184 carried by the studs 180 serve to adjustably limit the axial movement of shoe 154 towards plate 156 and shoe 152. If desired, and as shown, springs 186 may be provided on studs 180. These springs, of course, oppose the action of the hairpin springs 176 but are ineffective to prevent the latter from establishing the normal unexcited shoe spacing shown in the drawing.

The clutch plate 156 is carried by a hub 190, for rotation therewith, but for limited axial movement with respect thereto. More particularly, plate 156 is provided with a series of circumferentially distributed openings, which slidably receive the enlarged body portions of a corresponding series of studs 192, which are threaded into the flange of the hub 190. Springs 194 continuously urge the plate into direct engagement with the face of the hub 190, and normally maintain such engagement. When the unit is excited, plate 156 is magnetically drawn towards the shoe 152 and as shown is caused to directly engage the face thereof, through the interposed layer of bonding material, with a force determined by the ratio between the magnetic effect and the opposing springs 194. When such engagement is permitted, the face pressures are, in accordance with the invention, maintained low enough so as to prevent a breakdown of the lubricating film afforded by the lubricating component of the bonding material. As shown in Figure 1, simple springs 194 are employed. If desired, a compound spring arrangement, as shown in Figure 3, can be employed, in which view studs 192a are provided with spring cages 200 which receive somewhat heavier springs 202. Cages 200 maintain springs 202 ineffective until just prior to engagement between plate 156 and shoe 152. It will be appreciated that by properly proportioning springs 202, they may serve as stops, to interrupt the movement of plate 156 just prior to engagement with shoe 152, in which event, under excited conditions, small air gaps are maintained between shoe 152 and plate 156, and between plate 156 and shoe 154.

Hub 190 is keyed to the inner reduced end portion of the shaft 204 which, in line with conventional practice, receives bearing support from its associated transmission. Additionally, a pilot bearing 206 is preferably interposed between the inner end of shaft 204 and shoe 152. This latter bearing may be and preferably is provided with a usual shaft seal 208.

Shoe 152 is provided with an annular recess 210 which receives the exciting coil 212. One terminal 214 of coil 212 is electrically connected, as by a stud 216, to the shoe 152. Shoe 152 in turn is connected through casing member 164 and its neck 168 to a grounding brush 218, which is directly electrically connected to ground through bracket 220 and the clutch housing 222.

The other coil lead 224 is brought out to a terminal 226, which is connected through a wire 228 to the slip ring 230. Slip ring 230 is carried by neck 168, but is insulated therefrom by insulating elements 232. Power is brought to ring 230 through brush 234, which may be connected in any suitable manner to the ungrounded terminal of the battery (not shown).

As described in said Patent No. 2,519,449, different operating conditions determine the optimum proportionings of the magnetic and lubricating components of the powdered bonding material. Generally speaking, the previously specified proportionings of the components of the bonding material is preferred. Similarly, different operating conditions determine the optimum quantities of bonding material in relation to the free volume of the air gap space, or spaces. Generally speaking, the previously indicated volume relations are preferred; namely, a quantity of bonding material which exceeds the volume of the air gap, but which is less than the free volume of the enclosing chamber.

Coming now to the arrangements for insuring the presence in the air gap region of an adequate quantity of the bonding material, plate 156 is provided with a series of circumferentially distributed openings 240, and shoe 154 is provided with a corresponding series of angularly extending openings 242. Preferably, also, the shoe 152 is provided with a circumferentially distributed series of conducting passages defined by interconnecting passage portions 244, 246 and 248. The passages may be formed, as will be understood, by directly drilling the passage portions 244 and 248 so as to communicate with the radially extending portions 246. Portions 246 are closed by plates 249.

As before, rotation of the driving shoes 152 and 154 cause the bonding material to circulate in a cloudlike manner. The angularly directed passages 242 and 248 act as pumps or blowers to draw the bonding material thereinto and cause it to circulate in the air gap spaces at either side of the plate 156. As before, also, this continuous circulation enables the dry-lubricant component of the bonding material to build up a thin but lubricating film on the surface of the clutch elements, including the opposed clutching surfaces thereof, thereby adequately protecting these surfaces from any abrasive effect of the circulating magnetic particles. These lubricating surfaces also prevent abrasion of the opposed clutch surfaces when the unit is excited.

As aforesaid, a further and important feature of the invention resides in so arranging the structure that substantial amounts of the bonding material and particularly the magnetic component thereof are positively caused to remain on one or more of the opposed clutching surfaces. In the illustrated embodiment of the invention, this is accomplished by forming the shoes 152 and 154 and, if desired, the plate 156 of magnetic material having a pronounced amount of magnetic retentivity. As an example, both shoes and the plate 156 may be formed of cast iron or steel, the metallurgy of which provides the proper degree of retentivity. As shown, the circulating passages in the shoes are large enough to permit a free movement of the bonding material therethrough, even in view of the magnetic retentivity of these elements, in which event, as disclosed, the entire bodies of shoes 152 and 154 can be formed of the same material. If desired, of course, the bodies of these shoes may be formed of soft iron and they may be provided with opposed faces of the material of higher retentivity. In either arrangement, even under excited conditions, substantial amounts of the magnetic component of the bonding material are magnetically adhered to the opposed clutch faces, and are thus continually in readiness to establish the magnetic bond, as soon as the winding 212 is excited. As previously stated, in the broader aspects of the invention, either the circulating passage arrangement or the retentivity arrangement may be individually relied upon to accomplish the purpose of maintaining a sufficient amount of the bonding material in the gap at all times. Preferably and as illustrated, however, the two expedients are used together.

Summarizing the operation, under excited conditions of the winding 212, the plate 156 remains stationary and shoes 152 and 154 are driven. Under these conditions, the bonding material circulates in cloudlike form, portions thereof being caused by the circulating passages to continually circulate through the air gaps. Other portions of the bonding material are caused by the retentivity of the elements to adhere to the surfaces of the shoes or the plate, or both.

When the winding 212 is excited, the magnetic attraction between the shoes 152 and 154, and, in case plate 156 is formed of magnetic material, between shoe 152 and this plate, causes these elements to move toward each other. In the absence of restraint, direct contact is established therebetween, except to the extent that they are maintained spaced by the interposed film of bonding material. As illustrated, however, shoe 154 is continually spaced from plate 156, and plate 156 engages shoe 152.

In addition to drawing the clutch elements toward each other, as aforesaid, the excitation of winding 212 also causes the magnetic components of the bonding material which are interposed therebetween, to establish the previously identified bond between these elements.

The remaining embodiment shown in Figure 4 corresponds to the embodiment of Figure 1, except in the respects noted below. In Figure 4, the entire unit is carried by a shaft 250, which may be either the input shaft or the output shaft, but is usually the output shaft. Shoes 252 and 254 are rotatably carried by shaft 250 through ball bearing units 256 and 258. As before, shoe 254 constitutes one side of the enclosing housing of the unit and carries a cooperating shell member 260. Shoe 252 is carried by shell 260 for rotation therewith, but for axial movement with respect thereto, by pins 262. Springs 264 continuously urge the shoes apart and normally maintain the illustrated spacing therebetween.

The clutch plate 266 is carried by a spool-shaped hub 268, which in turn is keyed to the shaft 250. Hub 268 is provided with a series of circumferentially spaced pins 270, which slidably pass through apertures provided therefor in plate 266, and which consequently permit an axial movement of plate 266 with respect to the shoes. Stops 272, carried by the pins 270, normally hold plate 266 out of contact with shoe 252, and springs 274 yieldingly urge the plate against the stops 272.

Shoe 254 carries the pulley 276 which may serve either as an input or an output member but, as stated above, normally serves as the input member of the unit. Additionally, shoe 254 has securely fitted thereto a hub 278 which serves as a slip ring for cooperation with the grounding brush 280, and which also carries through interposed insulation 282 the companion slip ring 284. Slip ring 284 is slidably engaged by brush 286 which may be connected to the ungrounded side of the source of power. As before, slip ring 284 is connected through lead 288 to one terminal of the exciting winding 290. The other terminal of winding 290 is directly connected to the shoe 254, and thence through hub 278 and brush 280 to ground.

In operation, the unit of Figure 4 performs much as does the unit of Figure 1, with the exception that in this instance the magnetic retentivity of shoes 252 and 254 is entirely relied upon to maintain adequate amounts of the bonding material in the air gap. Also, in the arrangement of Figure 4, the shoes and plate directly engage each other except for the interposed layer of bonding material, it being appreciated that the strength of the magnetic field is so related to the opposing forces of the springs that the contact pressures between the opposed clutch surfaces are below those which would cause any breakdown of the lubricating film afforded by the lubricating component of the bonding material. Preferably, the proportionings of the components of the bonding material and the amounts thereof in relation to the free volume of the unit and the volume of the air gap spaces, corresponds to the proportionings and volumes discussed above in connection with Figure 1.

Although only several specific embodiments of the invention have been disclosed in detail, it will be appreciated that the improvements thereof may be embodied in other and widely differing specific structures. The disclosure herein, accordingly, of specific embodiments of the invention is to be taken in an illustrative and not in a limiting sense.

I claim:

1. A coupling device including at least a pair of coupling members mounted for rotation relative to each other and having radially and circumferentially extending opposed face portions which are normally spaced apart from each other along the axis of said relative rotation so as to define an air gap therebetween, said face portions being relatively movable along said axis to thereby vary said air gap, means adapting one of said members to act as a driving member and adapting the other of said members to apply a driving force to a load, means for establishing a magnetic field across said air gap and thereby drawing said face portions toward each other and at least reducing said air gap, and bonding material comprising finely divided magnetic particles and solid lubricant in said field and also responsive to said field for establishing a lubricated load transmitting bond between said face portions, whereby rotation of said one member at least tends to cause rotation of said other member, said coupling device being further characterized in that at least one of said members is continuously effective during both the presence and the absence of the action of said field establishing means and during both the presence and the absence of relative rotation between said members to maintain enough of said bonding material between said face portions to establish said bond therebetween immediately upon establishment of said field.

2. A coupling device including at least a pair of coupling members mounted for rotation relative to each other and having radially and circumferentially extending opposed face portions which are normally spaced apart from each other along the axis of said relative rotation so as to define an air gap therebetween and are relatively movable along said axis to thereby vary said air gap, means adapting one of said members to act as a driving member and adapting the other of said members to apply a driving force to a load, actuating means for moving said members towards each other and establishing a lubricated load transmitting bond between said face portions, said actuating means including means for establishing a magnetic field across said air gap, bonding material comprising finely divided magnetic particles and solid lubricant in said field and responsive thereto for establishing said lubricated load transmitting bond between said face portions, and said actuating means being effective to draw said face portions into face-to-face engagement with each other except to the extent that the same are separated by the bonding material interposed therebetween, said coupling device being further characterized in that at least one of said members is continuously effective during both the presence and the absence of the action of said field establishing means and during both the presence and the absence of relative rotation between said members to maintain enough of said bonding material between said face portions to establish said bond therebetween immediately upon establishment of said field.

3. A coupling device including at least a pair of coupling members mounted for rotation relative to each other and having radially and circumferentially extending opposed face portions which are normally spaced apart from each other along the axis of said relative rotation and are relatively movable along said axis to thereby vary said spacing, means adapting one of said members to act as a driving member and adapting the other of said members to apply a driving force to a load, actuating means for moving said members towards each other and establishing a lubricated load transmitting bond between said face portions, said actuating means including means for establishing a magnetic field across said space between said face portions, stop means acting between said coupling members to prevent face-to-face engagement between said face portions, and thereby maintain an air gap therebetween, and bonding material comprising finely divided magnetic particles and solid lubricant in said field and also responsive to said field for bridging said air gap and establishing said lubriacted load transmitting bond between said face portions whereby rotation of said one member at least tends to cause rotation of said other member, said coupling device being further characterized in that at least one of said members is continuously effective during both the presence and the absence of the action of said field establishing means and during both the presence and the absence of relative rotation between said members to maintain enough of said bonding material between said face portions to establish said bond therebetween immediately upon establishment of said field.

4. A coupling device including at least a pair of coupling members mounted for rotation relative to each other and having radially and circumferentially extending opposed face portions which are normally spaced apart from each other along the axis of said relative rotation so as to define an air gap therebetween, said face portions being relatively movable along said axis to thereby vary said air gap, means adapting one of said members to act as a driving member and adapting the other of said members to apply a driving force to a load, means for establishing a magnetic field across said air gap and thereby drawing said face portions toward each other and at least reducing said air gap, and bonding material comprising finely divided magnetic particles and solid lubricant in said field and also responsive to said field for establishing a lubricated load transmitting bond between said face portions, whereby rotation of said one member at least tends to cause rotation of said other member, said coupling device being further characterized in that at least one of said members has sufficient magnetic retentivity so that it is continuously effective during both the presence and the absence of the action of said field establishing means and during both the presence and the absence of relative rotation between said members to maintain enough of said bonding material between said face portions to establish said bond therebetween immediately upon establishment of said field.

References Cited in the file of this patent

UNITED STATES PATENTS

| | | |
|---|---|---|
| 811,654 | Murphy | Feb. 6, 1906 |
| 1,622,261 | Payne | Mar. 22, 1927 |
| 2,519,449 | Findley | Aug. 22, 1950 |
| 2,525,571 | Winther | Oct. 10, 1950 |
| 2,541,831 | Prince | Feb. 13, 1951 |
| 2,575,360 | Rabinow | Nov. 20, 1951 |
| 2,580,869 | Winther | Jan. 1, 1952 |
| 2,601,076 | Winther et al. | June 17, 1952 |
| 2,604,964 | Winther | July 29, 1952 |

FOREIGN PATENTS

| | | |
|---|---|---|
| 485,591 | Belgium | Nov. 13, 1948 |

OTHER REFERENCES

Technical Report 1213, National Bureau of Standards, Washington, D. C.